United States Patent [19]

Fuchs et al.

[11] Patent Number: 5,781,295
[45] Date of Patent: Jul. 14, 1998

[54] INTERFEROMETER FOR ABSOLUTE DISTANCE MEASUREMENT

[75] Inventors: Werner Fuchs, Cospeda; Andreas Wolfram, Karlsburg; Karl-Heinz Bechstein, Jena; Klaus Dieter Salewski, Greifswald, all of Germany

[73] Assignee: Carl Zeiss Jena GmbH, Jena, Germany

[21] Appl. No.: 693,624

[22] Filed: Aug. 8, 1996

[51] Int. Cl.$^6$ ..................... G01B 9/02
[52] U.S. Cl. ..................... 356/349; 356/358
[58] Field of Search ..................... 356/349, 358

[56] References Cited

U.S. PATENT DOCUMENTS

| 4,688,940 | 8/1987 | Sommargren et al. | 356/349 |
| 4,907,886 | 3/1990 | Dandliker | 356/349 |
| 5,274,436 | 12/1993 | Chaney | 356/349 |
| 5,404,222 | 4/1995 | Lis | 356/349 |

FOREIGN PATENT DOCUMENTS

| 0 431 792 | 6/1991 | European Pat. Off. |
| 41 39 839 | 6/1993 | Germany |

Primary Examiner—Frank G. Font
Assistant Examiner—Amanda Merlino
Attorney, Agent, or Firm—McAulay Fisher Nissen Goldberg & Kiel, LLP

[57] ABSTRACT

An interferometer for absolute distance measurement with two lasers, one of which is tunable with respect to frequency. A device for collinear superposition of the laser beams is arranged downstream of the lasers. Further, interferometer units are provided whose optical path lengths differ from one another. An individual acousto-optical modulator (AOM) is arranged downstream of the device for superposing the beams. Light-conducting elements for guiding the beams are arranged between the AOM, between the AOM and at least one first beam splitter arranged downstream of the AOM, and between the light outputs of the first beam splitter and the light inputs of one or more interferometer units arranged downstream and/or within these interferometer units.

3 Claims, 2 Drawing Sheets

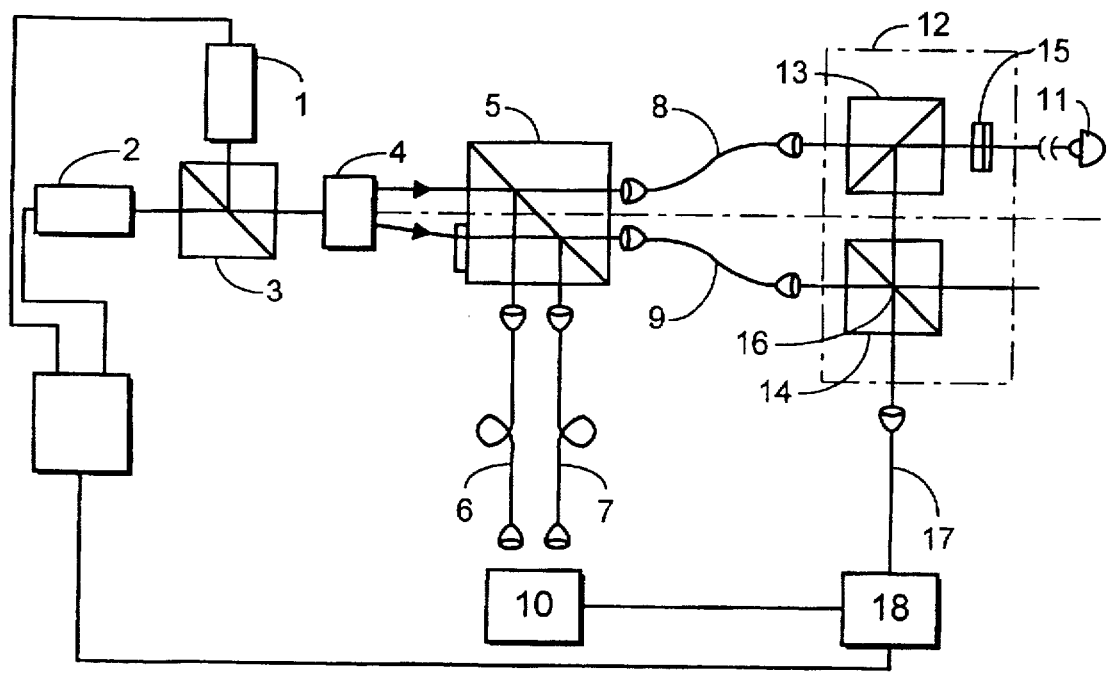
FIG. 1
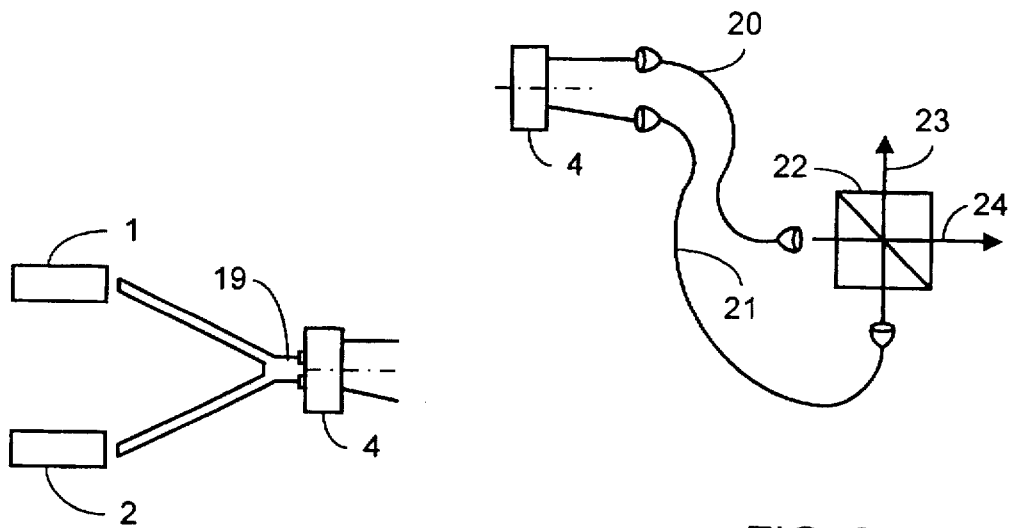
FIG. 2
FIG. 3

INTERFEROMETER FOR ABSOLUTE DISTANCE MEASUREMENT

BACKGROUND OF THE INVENTION a) Field of the Invention

The invention is directed to an interferometer for absolute distance measurement with two lasers of different frequencies, at least one of which is tunable.

b) Description of the Related Art

Methods based on a variable synthetic wavelength have been shown to be advantageous for absolute distance interferometry (ADI). Changes in these wavelengths are achieved by changing the frequency of the two lasers employed, their beam bundles being superposed collinearly by means of suitable optical elements.

Known methods for absolute distance interferometry use at least one laser with a tunable wavelength. These methods differ from one another in the way that the phase change is detected. Arrangements with two lasers use the heterodyne method for this purpose and form the necessary phase difference by means of analog circuits such as mixers and filters. In the known arrangements, acousto-optical modulators (AOM) are arranged downstream of the lasers in order to shift the frequency of the laser beam and thus generate a suitable intermediate frequency which can be detected by photoelectric receivers. This intermediate frequency contains all of the necessary phase information required for distance measurement. Electronic mixing and filtering result in periodic signals which, given a continuous change in at least one of the optical wavelengths within the interferometer, are proportional to this change (detuning) as well as to the path difference of the interferometer. On the other hand, there are other interferometer units which differ with respect to optical path differences and which serve as reference interferometers or comparison interferometers. The electronic mixing stages and filter stages combine the different interferometer signals in such a way that changes in phase angle are detected which are independent from the frequencies of the acousto-optical modulators and are caused only by variation in laser frequency and are proportional to the reflector distances. The signals are sent to a computer via electronic analog-to-digital converters for further processing and evaluation of the signal waveforms.

Arrangements shown in U.S. Pat. No. 4,907,886, DE 41 39 839 and a proposed interferometer arrangement comprise two variable-frequency acousto-optical modulators for forming the heterodyne signals. Among other possibilities, this enables a generation of signals which also allows for exact phase measurement in a non-monotonic tuning process, e.g., due to frequency jitter. However, the disadvantage in the known interferometer consists in the considerable technological expenditure involved in optical beam guidance and electronic signal evaluation. A particular problem consists in that two different beam splitting points exist within the interferometer arrangement due to the use of two acousto-optical modulators. The resulting difference in the path differences combined with the different conditions in the individual portions of the interferometer arrangement can result in uncontrollable phase fluctuations in the interferometer signals. For this reason, the prior art arrangements require a reference interferometer to which the signals of all of the other interferometers employed must be related.

U.S. Pat. No. 4,892,406 describes a method and an arrangement for interferometric measurement of vibration in objects. For this purpose, a laser beam with a predetermined coherence length is split into a measurement beam and a reference beam. Light guides are used to relay light and also to generate a delay of a specified period in the reference beam relative to the measurement beam. Aside from connecting the optical components, the light guides used in this case also function as fiber-optic couplers for connecting the different beams. This arrangement is not suitable for length or distance measurement.

The technical cost for signal generation and signal analysis is reduced through the use of lasers with monotonic tuning behavior.

OBJECT AND SUMMARY OF THE INVENTION

Therefore, the primary object of the present invention is to provide an interferometer arrangement for absolute distance measurement with variable synthetic wavelength which extensively ensures identical beam geometry for all superposed beam bundles while economizing on controlled phase functions and in which the influence of environmental conditions on the phase resolution is reduced.

According to the invention, this object is met in an interferometer arrangement for absolute distance measurement with two lasers of different frequencies, at least one of which being tunable, with optical devices for collinear superposition of the laser beams, with optical devices for collinear superimposition of the laser beams and with an acousto-optical modulator for generating heterodyne signals from which periodic signals can be generated after electronic mixing and filtering, which periodic signals, given a continuous change in at least one of the two laser frequencies, undergo phase angle changes which are proportional to the optical path lengths realized within the first interferometer unit. The arrangement also has at least one additional interferometer unit whose optical path lengths differ from those of the first interferometer unit and which serves as a reference interferometer or comparison interferometer, with mixing stages and filter stages for combining the different interferometer signals so that signals can be generated which indicate, irrespective of frequency, all phase angle changes which are caused by variation in laser frequency and are dependent upon the reflector distances, and with electronic analog-to-digital converters which receive the signals during laser tuning and transmit the signals to a microcomputer for evaluation of the signal waveforms over time. The arrangement has, as an improvement, that only one acousto-optical modulator is arranged downstream of the two lasers. Further, light-conducting elements are arranged between the two lasers and the acousto-optical modulator, between the acousto-optical modulator and at least one first beam splitter arranged downstream of the acousto-optical modulator, and between the light outputs of the first beam splitter and the light inputs of one or more interferometer units arranged downstream and/or within these interferometer units for the purpose of beam guidance such that an identical beam geometry is ensured for all superposed beam bundles.

The invention has the advantage that only one individual acousto-optical modulator is used as a means for shifting the frequency of the laser beams. Accordingly, there is only one beam splitting point. Uncontrolled phase fluctuations are thus effectively prevented. An identical beam geometry is ensured for all superposed beam bundles and distortion differences in the wavefronts are very extensively prevented through the use of light guides between the lasers and the acousto-optical modulator, between the acousto-optical modulator and a first beam splitter arranged downstream, and between the light outputs of this beam splitter and the light inputs of interferometer units arranged downstream.

A simple construction is achieved in that a light coupler is provided between the lasers and the acousto-optical modulator for collinear combination of the laser beams. A light guide Y-coupler or a splitter prism can be used as light couplers.

The construction of the interferometer according to the invention is simplified in that the beam bundles of different frequencies exiting the acousto-optical modulator are guided directly to at least one Mach-Zehnder interferometer which is arranged downstream. These beam bundles can also be guided via another beam splitter to two Mach-Zehnder interferometers, the AOM serving as a first beam splitter common to both these interferometers The invention will be explained more fully in the following with reference to an embodiment example.

BRIEF DESCRIPTION OF THE DRAWINGS

In the drawings:

FIG. 1 is a schematic view showing the construction of an interferometer according to the invention;

FIG. 2 shows the arrangement of a light guide coupler between the lasers and AOM;

FIG. 3 shows the coupling of light into an interferometer arranged downstream.

DESCRIPTION OF THE PREFERRED EMBODIMENTS

Figure 4:
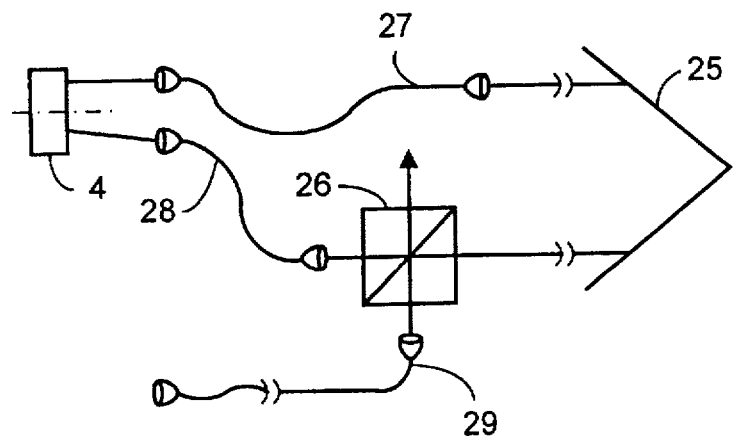
FIG. 4 shows the use of light guides in the measurement path of the interferometer.

The interferometer for absolute distance measurement which is shown schematically in a block diagram in FIG. 1 has two lasers 1 and 2 as light sources, at least one of which is tunable with respect to frequency. An optical coupler in the form of a beam splitter cube 3, known per se, is arranged downstream of the two lasers 1 and 2 for uniting the beams. The unified laser light bundles exiting the splitter cube 3 are guided directly to an AOM 4 for splitting the beam into two partial beams of different frequency. The partial beams coming from the AOM 4 are split in a first beam splitter 5 arranged downstream such that a portion is transmitted through monomode light-transmitting fibers 6 and 7, e.g., to a reference interferometer 10, and another portion is transmitted through monomode light-transmitting fibers 8 and 9 to the input of an interferometer unit 12 containing the measurement reflector 11 in its measurement beam path. These interferometer units 10 and 12 comprise two beam splitters 13 and 14 and elements 15 having an optical polarizing effect. The interference point 16 of this interferometer unit 12 is situated in the splitter layer of the beam splitter 14. The light coming from this interference point 16 is guided via multimode light-transmitting fibers 17 for conversion into electric signals to a converter unit and an evaluating unit 18 with which the outputs of the reference interferometer are also connected.

FIG. 2 shows the arrangement of a light coupler for collinear combination of the beam bundles emitted by the two lasers 1 and 2. This light coupler is constructed as a light guide coupler 19 with two laser-side inputs and an output coupled to the AOM 4.

FIG. 3 shows a construction in which the partial beams exiting the AOM are guided via light guides 20 and 21 to a beam splitter 22 arranged downstream. The light guides 20 and 21 are constructed as monomode light guides. In this construction, the beam splitter 22 functions as a splitter of a Mach-Zehnder interferometer with the two beam outputs 23 and 24.

FIG. 4 shows the use of light guides in the measurement path of the interferometer for absolute distance measurement. A light guide 27; 28 is provided respectively between the AOM 4 and a measurement reflector 25 on the one hand and between the AOM 4 and a splitter cube 26 on the other hand. One partial beam of the AOM 4 is guided through the light guide 27 directly to the measurement reflector 25. The light reflected by the measurement reflector 25 is guided to the splitter cube 26 and interfered at the splitter layer of this splitter cube 26 with the second partial beam of the AOM 4 which is guided via light guide 28. The interference patterns can then be guided to photoreceivers (not shown) via another light guide 29 to generate measurement signals. These signals are then processed in a manner known per se in an evaluating unit to obtain measurement values.

Figure 5:
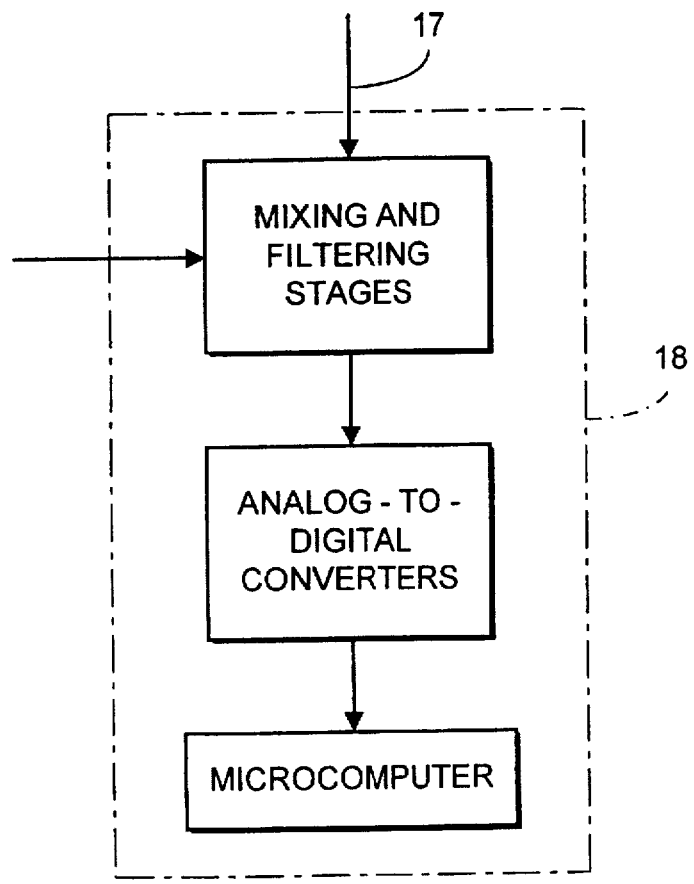
FIG. 5 is a block diagram showing components of a converter unit and evaluating unit illustrated in FIG. 1.

FIG. 5 shows components of converter and evaluating unit 8 shown in FIG. 1. Interferometer units 10 and 12 are operatively connected to mixing and filtering stages 30 in turn connected to electronic analog-to-digital converters 32. Converters 32 receive or register signals from mixing and filtering stages 30 during laser tuning or laser frequency variation and transmit those signals to a microcomputer 34 for evaluating signal waveforms over time.

While the foregoing description and drawings represent the preferred embodiments of the present invention, it will be obvious to those skilled in the art that various changes and modifications may be made therein without departing from the true spirit and scope of the present invention.

What is claimed is:

1. An interferometer assembly for absolute distance measurement, comprising:

two lasers producing respective light beams of different frequencies, at least one of said lasers being tunable to produce light beams having a variable frequency;

An optical device for collinear superposition of the light beams of the two lasers to produce a superimposed light beam;

exactly one acousto-optical modulator disposed downstream of said optical devices for receiving said superimposed light beam;

a first interferometer unit disposed downstream of said acousto-optical modulator for generating heterodyne or beat output signals from which periodic signals can be produced after electronic mixing and filtering, said periodic signals, during continuous variation of the frequency of said one of said lasers, undergoing phase angle changes proportional to optical path lengths in said first interferometer unit;

a second interferometer unit serving as a reference or comparison interferometer, said second interferometer unit having an optical path length different from the optical path lengths in said first interferometer unit, said second interferometer unit producing respective output signals;

mixing and filtering stages for combining or linking the output signals of said first interferometer unit and said second interferometer unit so that said periodic signals can be generated which, independently of the frequencies of the light beams of said lasers, indicate all phase angle changes which are caused by variation in laser frequency and are dependent on optical path lengths in said first interferometer unit and said second interferometer unit;

electronic analog-to-digital converters which receive or register the periodic signals during laser tuning and transmit said signals to a microcomputer for evaluating signal waveforms over time;

a beam splitter disposed between said acousto-optical modulator on an upstream side and said first interferometer unit and said second interferometer unit on a downstream side; and light conducting elements disposed between said two lasers and said acousto-optical modulator, between said acousto-optical modulator and said beam splitter, between at least one light output of said beam splitter and a light input of at least one of said first interferometer unit and said second interferometer unit, and within said first interferometer unit and said second interferometer unit, the light conducting elements being provided for beam guidance so that an identical beam geometry is ensured for any said superimposed light beam.

2. The interferometer assembly according to claim 4 wherein a light guide coupler for collinear combination of the light beams from said lasers is provided between said two lasers and said acousto-optical modulator.

3. The interferometer assembly according to claim 1 wherein at least one of said first interferometer unit and said second interferometer unit is a Mach-Zehnder interferometer.

* * * * *